(12) United States Patent
Chen et al.

(10) Patent No.: US 12,477,121 B2
(45) Date of Patent: Nov. 18, 2025

(54) LOSSLESS CODING MODES FOR VIDEO CODING

(71) Applicant: BEIJING DAJIA INTERNET INFORMATION TECHNOLOGY CO., LTD., Beijing (CN)

(72) Inventors: Yi-Wen Chen, San Diego, CA (US); Tsung-Chuan Ma, San Diego, CA (US); Xianglin Wang, San Diego, CA (US); Xiaoyu Xiu, San Diego, CA (US)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 218 days.

(21) Appl. No.: 17/561,577

(22) Filed: Dec. 23, 2021

(65) Prior Publication Data
US 2022/0124347 A1   Apr. 21, 2022

Related U.S. Application Data

(63) Continuation of application No. PCT/US2020/040195, filed on Jun. 29, 2020.
(Continued)

(51) Int. Cl.
*H04N 19/156* (2014.01)
*H04N 19/157* (2014.01)
(Continued)

(52) U.S. Cl.
CPC ......... *H04N 19/157* (2014.11); *H04N 19/176* (2014.11); *H04N 19/70* (2014.11)

(58) Field of Classification Search
CPC .... H04N 19/157; H04N 19/176; H04N 19/70; H04N 19/119; H04N 19/122; H04N 19/513; H04N 19/573
(Continued)

(56) References Cited

U.S. PATENT DOCUMENTS

2012/0230418 A1* 9/2012 Sole Rojals ........... H04N 19/61
                                                              375/240.18
2013/0294524 A1* 11/2013 Van Der Auwera ... H04N 19/60
                                                              375/240.18
(Continued)

FOREIGN PATENT DOCUMENTS

CN        101578881 B  *  6/2012  ........... H04N 19/105
CN        106105227 A     11/2016
(Continued)

OTHER PUBLICATIONS

First Office Action issued in Chinese Application No. 202210161569.0 dated Mar. 6, 2023 with English translation, (11p).
(Continued)

*Primary Examiner* — Behrooz M Senfi
(74) *Attorney, Agent, or Firm* — Arch & Lake LLP

(57) ABSTRACT

Methods and apparatuses are provided for video coding with lossless coding modes. The method includes: partitioning a video picture into a plurality of CUs comprising a lossless CU; determining a residual coding block size of the lossless CU; and in response to determining that the residual coding block size of the lossless CU is greater than a predefined maximum value, splitting the residual coding block into two or more residual blocks for residual coding.

17 Claims, 8 Drawing Sheets

Related U.S. Application Data

(60) Provisional application No. 62/871,134, filed on Jul. 6, 2019, provisional application No. 62/868,857, filed on Jun. 28, 2019.

(51) Int. Cl.
  *H04N 19/176* (2014.01)
  *H04N 19/70* (2014.01)

(58) Field of Classification Search
  USPC .................................................. 375/240.02
  See application file for complete search history.

(56) References Cited

U.S. PATENT DOCUMENTS

| 2016/0050426 | A1 | 2/2016 | Piao et al. | |
| 2017/0180737 | A1* | 6/2017 | Ye | H04N 19/70 |
| 2020/0329257 | A1* | 10/2020 | Zhao | H04N 19/615 |
| 2021/0266585 | A1* | 8/2021 | Liu | H04N 19/52 |
| 2022/0191543 | A1* | 6/2022 | He | H04N 19/597 |
| 2022/0303535 | A1* | 9/2022 | Poirier | H04N 19/182 |

FOREIGN PATENT DOCUMENTS

| KR | 1020160118365 A | 10/2016 | |
| KR | 1020180041774 A | 4/2018 | |
| WO | WO-2020256447 A1 * | 12/2020 | H04N 19/105 |

OTHER PUBLICATIONS

The office action of the cognate Japanese application No. 2021-577674 from JPO dated Nov. 8, 2022, with English translation,(9p).

InterDigital Communications, Inc. Yong He, et al.,"AHG8: On adaptive resolution change constraint", Joint Video Experts Team (JVET) of ITU-T SG 16 WP 3 and ISO/IEC JTC 1/SC 29/WG 11, JVET-O0184, 15th Meeting, Gothenburg, SE, Jul. 3-12, 2019, (5p).

Qualcomm Incorporated, Han Huang, et al., "DMVR and BDOF on/off control", Joint Video Experts Team (JVET) of ITU-T SG 16 WP 3 and ISO/IEC JTC 1/SC 29/WG 11, JVET-O0250, 15th Meeting, Gothenburg, SE, Jul. 3-12, 2019, (6p).

Supplementary European Search Report of EP Application No. 20831339.5 dated Jun. 29, 2022, (4p).

First Office Action of Korean Application No. 10-2021-7043013 dated Aug. 12, 2022 with English translation, (11p).

Sole, Joel, et al., "AhG8: Simplified update of the coefficient level Rice parameter", Joint Collaborative Team on Video Coding (JCT-VC) of ITU-T SG 16 WP 3 and ISO/IEC JTC 1/SC 29/WG 11, JCTVC-M0366, 13th Meeting: Incheon, KR, Apr. 18-26, 2013, (4p).

Sethuraman, Sriram, "Non-CE9: Header flags to disable DMVR and BDOF at finer granularities", Joint Video Experts Team (JVET) of ITU-T SG 16 WP 3 and ISO/IEC JTC 1/SC 29/G 11, JVET-O0504-v1, 15th Meeting: Gothenburg, SE, Jul. 3-12, 2019, (3p).

Chen, Jianle et al., "Algorithm description for Versatile Video Coding and Test Model 5 (VTM 5)", Joint Video Experts Team (JVET) of ITU-T SG 16 WP 3 and ISO/IEC JTC 1/SC 29/WG 11, JVET-N1002-v2, 14th Meeting: Geneva, CH, Mar. 19-27, 2019, (79p).

International Search Report issued to PCT/US2020/040195 dated Oct. 13, 2020, (3p).

Tsung-Chuan Ma et al., "Modifications to support the lossless coding", JVET-O0591, Joint Video Experts Team (JVET) of ITU-T SG 16 WP 3 and ISO/IEC JTC 1/SC 29/WG 11, 15th Meeting: Gothenburg, SE, Jun. 26, 2019, (5p).

* cited by examiner

LOSSLESS CODING MODES FOR VIDEO CODING

CROSS-REFERENCE TO RELATED APPLICATIONS

The present application is a continuation application of PCT application No. PCT/US2020/040195 filed on Jun. 29, 2020, which claims priority to U.S. Provisional Application No. 62/868,857, entitled "Lossless Coding Modes for Video Coding" filed on Jun. 28, 2019, and U.S. Provisional Application No. 62/871,134, entitled "Lossless Coding Modes for Video Coding" filed on Jul. 6, 2019, the disclosure of which are incorporated by reference in their entireties for all purpose.

FIELD

The present application generally relates to video coding and compression. More specifically, this disclosure relates to the improvements and simplifications of the lossless coding for video coding.

BACKGROUND

Various video coding techniques may be used to compress video data. Video coding is performed according to one or more video coding standards. For example, video coding standards include versatile video coding (VVC), joint exploration test model (JEM), high-efficiency video coding (H.265/HEVC), advanced video coding (H.264/AVC), moving picture expert group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality.

The first version of the HEVC standard was finalized in October 2013, which offers approximately 50% bit-rate saving or equivalent perceptual quality compared to the prior generation video coding standard H.264/MPEG AVC. Although the HEVC standard provides significant coding improvements than its predecessor, there is evidence that superior coding efficiency can be achieved with additional coding tools over HEVC. Based on that, both VCEG and MPEG started the exploration work of new coding technologies for future video coding standardization. one Joint Video Exploration Team (JVET) was formed in October 2015 by ITU-T VECG and ISO/IEC MPEG to begin significant study of advanced technologies that could enable substantial enhancement of coding efficiency. One reference software called joint exploration model (JEM) was maintained by the JVET by integrating several additional coding tools on top of the HEVC test model (HM).

In October 2017, the joint call for proposals (CfP) on video compression with capability beyond HEVC was issued by ITU-T and ISO/IEC. In April 2018, 23 CfP responses were received and evaluated at the 10-th JVET meeting, which demonstrated compression efficiency gain over the HEVC around 40%. Based on such evaluation results, the JVET launched a new project to develop the new generation video coding standard that is named as Versatile Video Coding (VVC). In the same month, one reference software codebase, called VVC test model (VTM), was established for demonstrating a reference implementation of the VVC standard.

SUMMARY

In general, this disclosure describes examples of techniques relating to lossless coding modes in video coding.

According to a first aspect of the present disclosure, a method of lossless coding modes for video coding is provided, including: partitioning a video picture into a plurality of coding units (CUs) comprising a lossless CU; determining a residual coding block size of the lossless CU; and in response to determining that the residual coding block size of the lossless CU is greater than a predefined maximum value, splitting the residual coding block into two or more residual blocks for residual coding.

According to a second aspect of the present disclosure, a method of lossless coding modes for video coding is provided, including: partitioning a video picture into a plurality of coding units (CUs) comprising a lossless CU; and selecting a residual coding scheme for the lossless CU, wherein the residual coding scheme selected for the lossless CU is same as the residual coding scheme used by non-transform skip mode CUs.

According to a third aspect of the present disclosure, an apparatus of lossless coding modes for video coding is provided, including: one or more processors; and a memory configured to store instructions executable by the one or more processors; wherein the one or more processors, upon execution of the instructions, are configured to: partition a video picture into a plurality of CUs comprising a lossless CU; determine a residual coding block size of the lossless CU; and in response to determining that the residual coding block size of the lossless CU is greater than a predefined maximum value, split the residual coding block into two or more residual blocks for residual coding.

According to a fourth aspect of the present disclosure, an apparatus of lossless coding modes for video coding is provided, including: one or more processors; and a memory configured to store instructions executable by the one or more processors; wherein the one or more processors, upon execution of the instructions, are configured to: partition a video picture into a plurality of CUs comprising a lossless CU; and select a residual coding scheme for the lossless CU, wherein the residual coding scheme selected for the lossless CU is same as the residual coding scheme used by non-transform skip mode CUs.

According to a fifth aspect of the present disclosure, there is an apparatus for video coding provided, including: one or more processors; and a non-transitory storage medium configured to store instructions executable by the one or more processors; wherein the instructions, when executed, cause the one or more processors to perform acts comprising: partitioning a video picture into a plurality of CUs comprising a lossless CU; determining a residual coding block size of the lossless CU; and in response to determining that the residual coding block size of the lossless CU is greater than a predefined maximum value, splitting the residual coding block into two or more residual blocks for residual coding.

According to a sixth aspect of the present disclosure, there is an apparatus for video coding provided, including: one or more processors; and a non-transitory storage medium configured to store instructions executable by the one or more processors; wherein the instructions, when executed, cause the one or more processors to perform acts comprising: partitioning a video picture into a plurality of CUs comprising a lossless CU; and selecting a residual coding scheme for the lossless CU, wherein the residual coding scheme selected for the lossless CU is same as the residual coding scheme used by non-transform skip mode CUs.

BRIEF DESCRIPTION OF THE DRAWINGS

A more particular description of the examples of the present disclosure will be rendered by reference to specific examples illustrated in the appended drawings. Given that these drawings depict only some examples and are not therefore considered to be limiting in scope, the examples will be described and explained with additional specificity and details through the use of the accompanying drawings.

DETAILED DESCRIPTION

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used. For example, it will be apparent to one of ordinary skill in the art that the subject matter presented herein may be implemented on many types of electronic devices with digital video capabilities.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

Throughout the disclosure, the terms "first," "second," "third," etc. are all used as nomenclature only for references to relevant elements, e.g. devices, components, compositions, steps, etc., without implying any spatial or chronological orders, unless expressly specified otherwise. For example, a "first device" and a "second device" may refer to two separately formed devices, or two parts, components or operational states of a same device, and may be named arbitrarily.

As used herein, the term "if" or "when" may be understood to mean "upon" or "in response to" depending on the context. These terms, if appear in a claim, may not indicate that the relevant limitations or features are conditional or optional.

The terms "module," "sub-module," "circuit," "sub-circuit," "circuitry," "sub-circuitry," "unit," or "sub-unit" may include memory (shared, dedicated, or group) that stores code or instructions that may be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Figure 1:
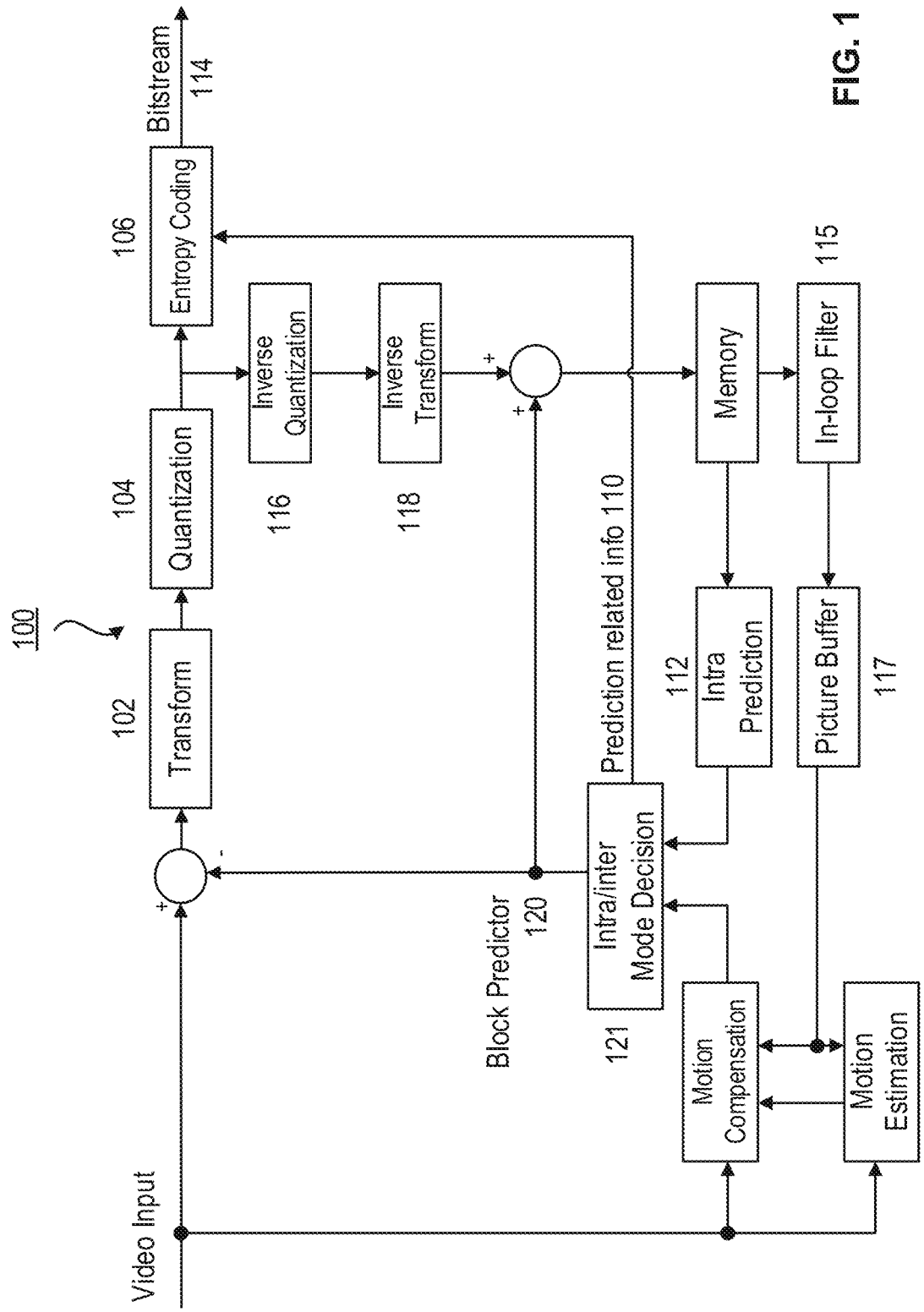
FIG. 1 is a block diagram illustrating an exemplary video encoder in accordance with some implementations of the present disclosure.

FIG. 1 shows a block diagram illustrating an exemplary block-based hybrid video encoder 100 which may be used in conjunction with many video coding standards using block-based processing. The VVC is built upon the block-based hybrid video coding framework. In the encoder 100, the input video signal is processed block by block, which may be called coding units (CUs). In VTM-1.0, CU can be up to 128×128 pixels. However, different from the HEVC which partitions blocks only based on quad-trees, in the VVC, one coding tree unit (CTU) is split into CUs to adapt to varying local characteristics based on quad/binary/ternary-tree. By definition, coding tree block (CTB) is an N×N block of samples for some value of N such that the division of a component into CTBs is a partitioning. CTU includes a CTB of luma samples, two corresponding CTBs of chroma samples of a picture that has three sample arrays, or a CTB of samples of a monochrome picture or a picture that is coded using three separate colour planes and syntax structures used to code the samples. Additionally, the concept of multiple partition unit type in the HEVC is removed, i.e., the separation of CU, prediction unit (PU) and transform unit (TU) does not exist in the VVC anymore; instead, each CU is always used as the basic unit for both prediction and transform without further partitions.

Figures 2A, 2B, 2C:
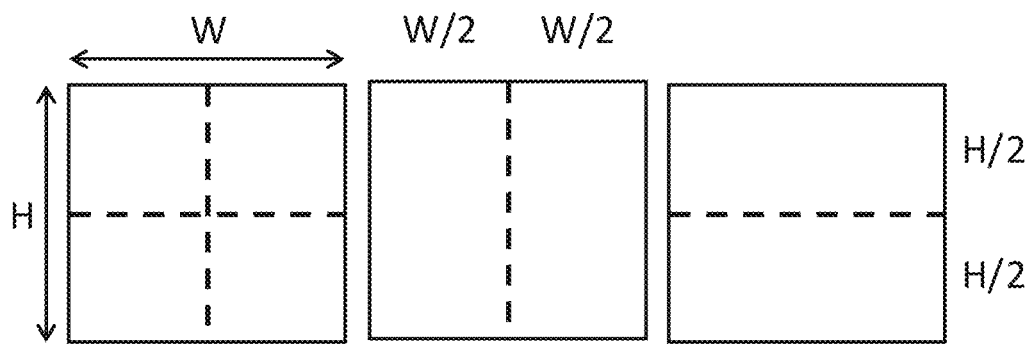
FIG. 2A is a schematic diagram illustrating a quaternary block partition in the multi-type tree structure in accordance with some implementations of the present disclosure.
FIG. 2B is a schematic diagram illustrating a horizontal binary block partition in the multi-type tree structure in accordance with some implementations of the present disclosure.
FIG. 2C is a schematic diagram illustrating a vertical binary block partition in the multi-type tree structure in accordance with some implementations of the present disclosure.
Figures 2D, 2E:
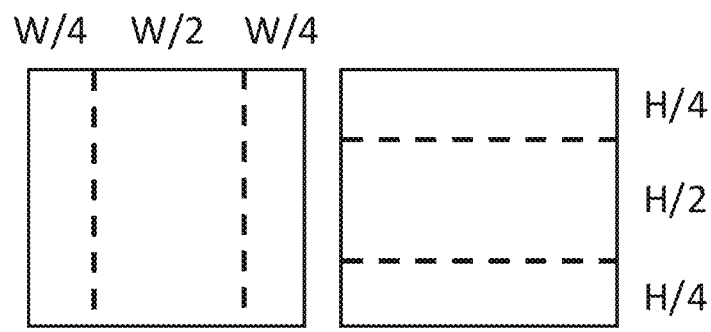
FIG. 2D is a schematic diagram illustrating a horizontal ternary block partition in the multi-type tree structure in accordance with some implementations of the present disclosure.
FIG. 2E is a schematic diagram illustrating a vertical ternary block partition in the multi-type tree structure in accordance with some implementations of the present disclosure.

In the multi-type tree structure, one CTU is firstly partitioned by a quad-tree structure. Then, each quad-tree leaf node can be further partitioned by a binary and ternary tree structure. As shown in FIGS. 2A-2E, there are five splitting types, quaternary partitioning (FIG. 2A), horizontal binary partitioning (FIG. 2B), vertical binary partitioning (FIG. 2C), horizontal ternary partitioning (FIG. 2D), and vertical ternary partitioning (FIG. 2E).

For each given video block, a prediction is formed based on either an inter prediction approach or an intra prediction approach. In inter prediction, one or more predictors are formed through motion estimation and motion compensation, based on pixels from previously reconstructed frames. In intra prediction, predictors are formed based on reconstructed pixels in a current frame. Through mode decision, a best predictor may be chosen to predict a current block.

A prediction residual, representing the difference between a current video block and its predictor, is sent to a Transform circuitry 102. Transform coefficients are then sent from the Transform circuitry 102 to a Quantization circuitry 104 for entropy reduction. Quantized coefficients are then fed to an Entropy Coding circuitry 106 to generate a compressed video bitstream. As shown in FIG. 1, prediction-related information 110 from an inter prediction circuitry and/or an Intra Prediction circuitry 112, such as video block partition info, motion vectors, reference picture index, and intra prediction mode, are also fed through the Entropy Coding circuitry 106 and saved into a compressed video bitstream 114.

In the encoder 100, decoder-related circuitries are also needed in order to reconstruct pixels for the purpose of prediction. First, a prediction residual is reconstructed through an Inverse Quantization 116 and an Inverse Transform circuitry 118. This reconstructed prediction residual is combined with a Block Predictor 120 to generate un-filtered reconstructed pixels for a current video block.

Spatial prediction (or "intra prediction") uses pixels from samples of already coded neighboring blocks (which are called reference samples) in the same video frame as the current video block to predict the current video block.

Temporal prediction (also referred to as "inter prediction") uses reconstructed pixels from already-coded video pictures to predict the current video block. Temporal prediction reduces temporal redundancy inherent in the video signal. Temporal prediction signal for a given coding unit (CU) or coding block is usually signaled by one or more motion vectors (MVs) which indicate the amount and the direction of motion between the current CU and its temporal reference. Further, if multiple reference pictures are supported, one reference picture index is additionally sent, which is used to identify from which reference picture in the reference picture store the temporal prediction signal comes.

After spatial and/or temporal prediction is performed, an intra/inter mode decision circuitry 121 in the encoder 100 chooses the best prediction mode, for example based on the rate-distortion optimization method. The block predictor 120 is then subtracted from the current video block; and the resulting prediction residual is de-correlated using the transform circuitry 102 and the quantization circuitry 104. The resulting quantized residual coefficients are inverse quantized by the inverse quantization circuitry 116 and inverse transformed by the inverse transform circuitry 118 to form the reconstructed residual, which is then added back to the prediction block to form the reconstructed signal of the CU. Further in-loop filtering 115, such as a deblocking filter, a sample adaptive offset (SAO), and/or an adaptive in-loop filter (ALF) may be applied on the reconstructed CU before it is put in the reference picture store of the picture buffer 117 and used to code future video blocks. To form the output video bitstream 114, coding mode (inter or intra), prediction mode information, motion information, and quantized residual coefficients are all sent to the entropy coding unit 106 to be further compressed and packed to form the bit-stream.

For example, a deblocking filter is available in AVC, HEVC as well as the now-current version of VVC. In HEVC, an additional in-loop filter called SAO (sample adaptive offset) is defined to further improve coding efficiency. In the now-current version of the VVC standard, yet another in-loop filter called ALF (adaptive loop filter) is being actively investigated, and it has a good chance of being included in the final standard.

These in-loop filter operations are optional. Performing these operations helps to improve coding efficiency and visual quality. They may also be turned off as a decision rendered by the encoder 100 to save computational complexity.

It should be noted that intra prediction is usually based on unfiltered reconstructed pixels, while inter prediction is based on filtered reconstructed pixels if these filter options are turned on by the encoder 100.

Figure 3:
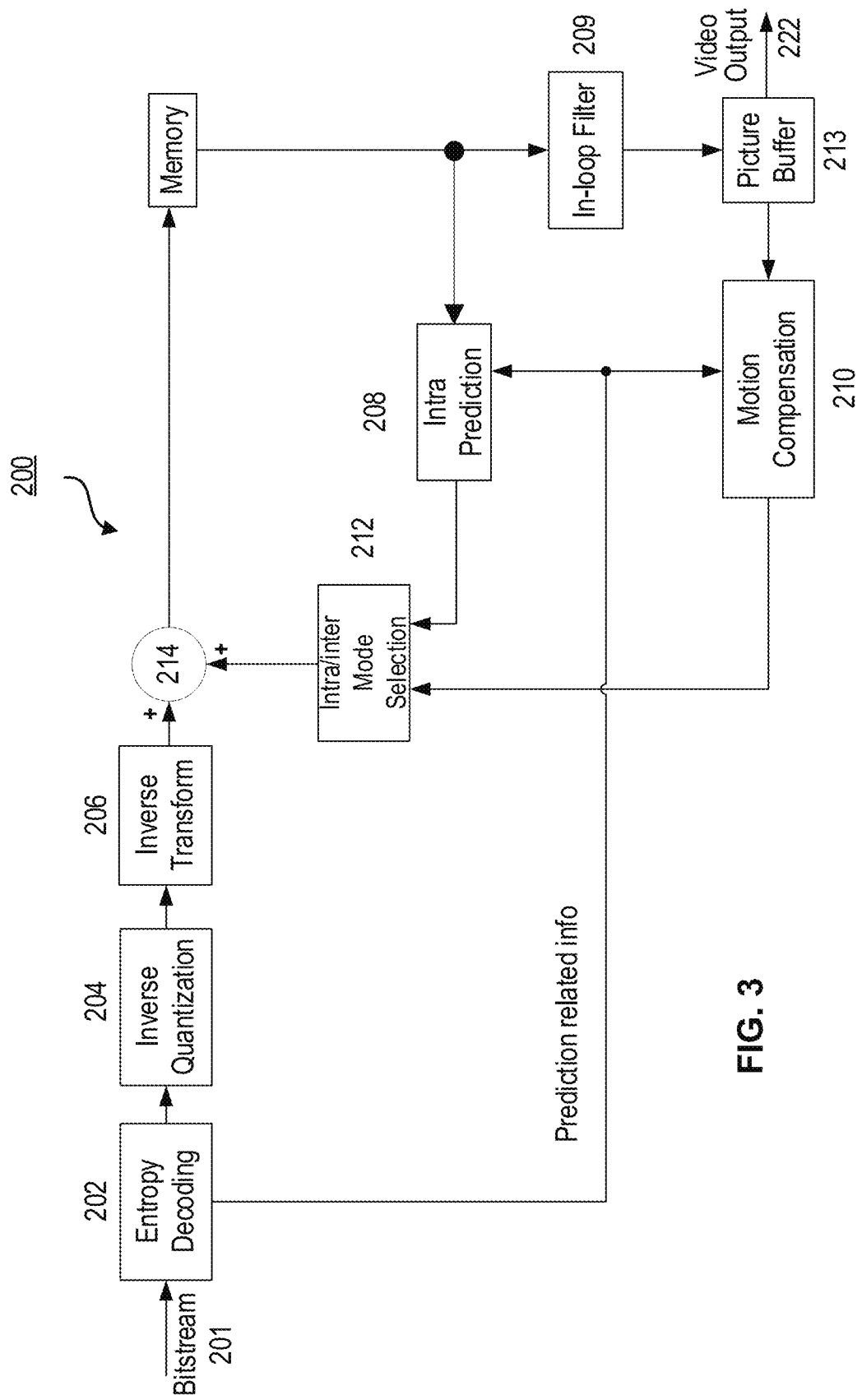
FIG. 3 is a block diagram illustrating an exemplary video decoder in accordance with some implementations of the present disclosure.

FIG. 3 is a block diagram illustrating an exemplary block-based video decoder 200 which may be used in conjunction with many video coding standards. This decoder 200 is similar to the reconstruction-related section residing in the encoder 100 of FIG. 1. In the decoder 200, an incoming video bitstream 201 is first decoded through an Entropy Decoding 202 to derive quantized coefficient levels and prediction-related information. The quantized coefficient levels are then processed through an Inverse Quantization 204 and an Inverse Transform 206 to obtain a reconstructed prediction residual. A block predictor mechanism, implemented in an Intra/inter Mode Selector 212, is configured to perform either an Intra Prediction 208, or a Motion Compensation 210, based on decoded prediction information. A set of unfiltered reconstructed pixels are obtained by summing up the reconstructed prediction residual from the Inverse Transform 206 and a predictive output generated by the block predictor mechanism, using a summer 214.

The reconstructed block may further go through an In-Loop Filter 209 before it is stored in a Picture Buffer 213 which functions as a reference picture store. The reconstructed video in the Picture Buffer 213 may be sent to drive a display device, as well as used to predict future video blocks. In situations where the In-Loop Filter 209 is turned on, a filtering operation is performed on these reconstructed pixels to derive a final reconstructed Video Output 222.

In general, the basic intra prediction scheme applied in the VVC is kept the same as that of the HEVC, except that several modules are further extended and/or improved, e.g., intra sub-partition (ISP) coding mode, extended intra prediction with wide-angle intra directions, position-dependent intra prediction combination (PDPC) and 4-tap intra interpolation.

Partitioning of Pictures, Tile Groups, Tiles, and CTUs in VVC

In VVC, tile is defined as a rectangular region of CTUs within a particular tile column and a particular tile row in a picture. Tile group is a group of an integer number of tiles of a picture that are exclusively contained in a single NAL unit. Basically, the concept of tile group is the same as slice as defined in HEVC. For example, pictures are divided into tile groups and tiles.

A tile is a sequence of CTUs that cover a rectangular region of a picture. A tile group contains a number of tiles of a picture. Two modes of tile groups are supported, namely the raster-scan tile group mode and the rectangular tile group mode. In the raster-scan tile group mode, a tile group contains a sequence of tiles in tile raster scan of a picture. In the rectangular tile group mode, a tile group contains a number of tiles of a picture that collectively form a rectangular region of the picture. The tiles within a rectangular tile group are in the order of tile raster scan of the tile group.

Figure 4:
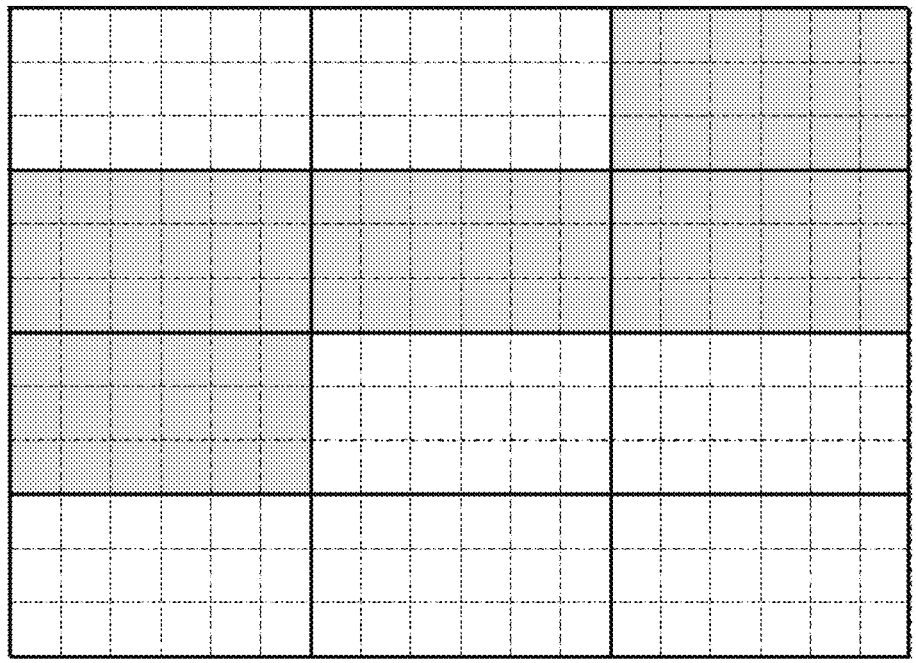
FIG. 4 is a schematic diagram illustrating an example of a picture that is divided into CTUs and further partitioned into tiles and tile groups in accordance with some implementations of the present disclosure.

FIG. 4 shows an example of raster-scan tile group partitioning of a picture, where the picture is divided into 12 tiles and 3 raster-scan tile groups.

Figure 5:
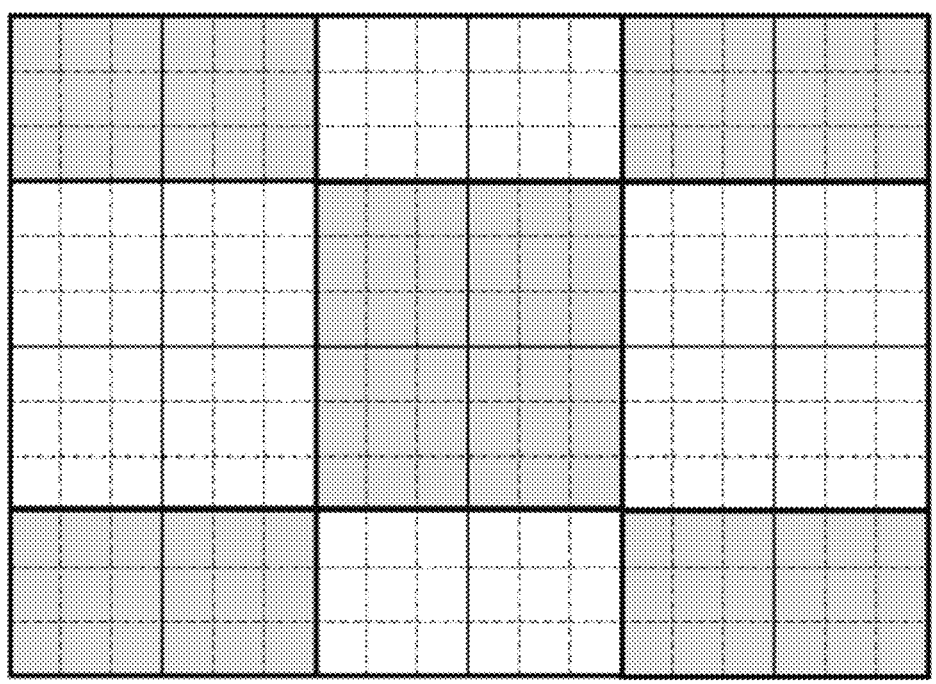
FIG. 5 is a schematic diagram illustrating another example of a picture that is divided into CTUs and further partitioned into tiles and tile groups in accordance with some implementations of the present disclosure.

FIG. 5 shows an example of rectangular tile group partitioning of a picture, where the picture is divided into 24 tiles (6 tile columns and 4 tile rows) and 9 rectangular tile groups.

Large Block-Size Transforms with High-Frequency Zeroing in VVC

In VTM4, large block-size transforms, up to 64×64 in size, are enabled, which is primarily useful for higher resolution video, e.g., 1080p and 4K sequences. High frequency transform coefficients are zeroed out for the transform blocks with size (width or height, or both width and height) equal to 64, so that only the lower-frequency coefficients are retained. For example, for an M×N transform block, with M as the block width and N as the block height, when M is equal to 64, only the left 32 columns of transform coefficients are kept. Similarly, when N is equal to 64, only the top 32 rows of transform coefficients are kept. When transform skip mode is used for a large block, the entire block is used without zeroing out any values.

Virtual Pipeline Data Units (VPDUs) in VVC

Virtual pipeline data units (VPDUs) are defined as non-overlapping units in a picture. In hardware decoders, successive VPDUs are processed by multiple pipeline stages at the same time. The VPDU size is roughly proportional to the buffer size in most pipeline stages, so it is important to keep the VPDU size small. In most hardware decoders, the VPDU size can be set to maximum transform block (TB) size. However, in VVC, ternary tree (TT) and binary tree (BT) partition may lead to the increasing of VPDUs size.

In order to keep the VPDU size as 64×64 luma samples, the following normative partition restrictions (with syntax signaling modification) are applied in VTM5, as shown in FIGS. 6A-6H. For convenience, we label the examples in FIGS. 6A-6D from left to right for the upper examples, and FIGS. 6E-6H from left to right for the bottom examples.

TT split is not allowed for a CU with either width or height, or both width and height equal to 128. (FIGS. 6A, 6B, 6E, 6F, 6G and 6H).

Figure 6A:
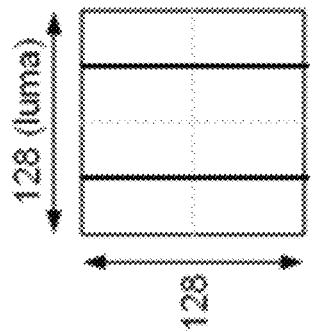
FIG. 6A is a schematic diagram illustrating an example of disallowed TT and BT partitioning in accordance with some implementations of the present disclosure.
Figure 6B:
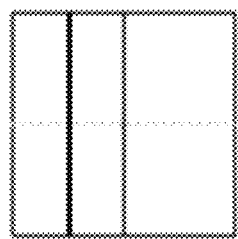
FIG. 6B is a schematic diagram illustrating an example of disallowed TT and BT partitioning in accordance with some implementations of the present disclosure.
Figure 6C:
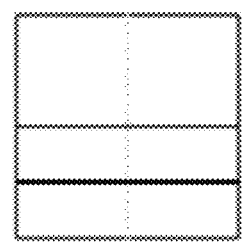
FIG. 6C is a schematic diagram illustrating an example of disallowed TT and BT partitioning in accordance with some implementations of the present disclosure.
Figure 6D:
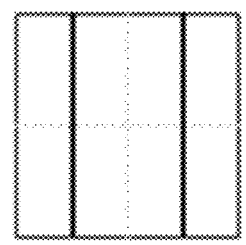
FIG. 6D is a schematic diagram illustrating an example of disallowed TT and BT partitioning in accordance with some implementations of the present disclosure.
Figure 6E:
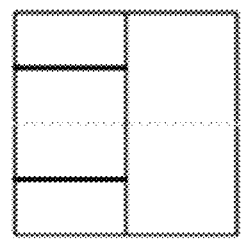
FIG. 6E is a schematic diagram illustrating an example of disallowed TT and BT partitioning in accordance with some implementations of the present disclosure.
Figure 6F:
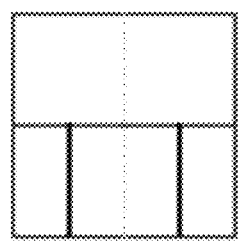
FIG. 6F is a schematic diagram illustrating an example of disallowed TT and BT partitioning in accordance with some implementations of the present disclosure.
Figure 6G:
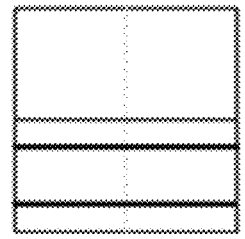
FIG. 6G is a schematic diagram illustrating an example of disallowed TT and BT partitioning in accordance with some implementations of the present disclosure.
Figure 6H:
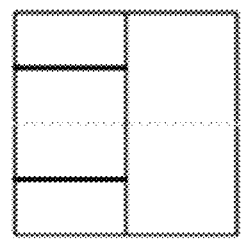
FIG. 6H is a schematic diagram illustrating an example of disallowed TT and BT partitioning in accordance with some implementations of the present disclosure.

For a 128×N CU with N≤128 (i.e. width equal to 128 and height smaller than or equal to 128), horizontal BT is not allowed. (FIG. 6D).

For a N×128 CU with N≤128 (i.e. height equal to 128 and width smaller than or equal to 128), vertical BT is not allowed. (FIG. 6C).

Transform Coefficient Coding in VVC

Transform coefficient coding refers to the coding process of transform coefficient quantization level values of a TU. In HEVC, transform coefficients of a coding block are coded using non-overlapped coefficient groups (or subblocks), and each CG contains the coefficients of a 4×4 block of a coding block. The CGs inside a coding block, and the transform coefficients within a CG, are coded according to pre-defined scan orders. The coding of transform coefficient levels of a CG with at least one non-zero transform coefficient may be separated into multiple scan passes. In the first pass, the first bin (denoted by bin0, also referred as significant_coeff_flag, which indicates the magnitude of the coefficient is greater than 0) is coded. Next, two scan passes for context coding the second/third bins (denoted by bin1 and bin2, respectively, also referred as coeff_abs_greater1_flag and coeff_abs_greater2_flag) may be applied. Finally, two more scan passes for coding the sign information and the remaining values (also referred as coeff_abs_level_remaining) of coefficient levels are invoked, if necessary. Note that only bins in the first three scan passes are coded in a regular mode and those bins are termed regular bins in the following descriptions.

In the VVC 3, for each subblock, the regular coded bins and the bypass coded bins are separated in coding order; first all regular coded bins for a subblock are transmitted and, thereafter, the bypass coded bins are transmitted. The transform coefficient levels of a subblock are coded in four passes over the scan positions as follows:

Pass 1: coding of significance (sig_flag), greater 1 flag (gt1_flag), parity (par_level_flag) and greater 2 flags (gt2_flag) is processed in coding order. If sig_flag is equal to 1, first the gt1_flag is coded (which specifies whether the absolute level is greater than 1). If gt1_flag is equal to 1, the par_level_flag is additionally coded (it specifies the parity of the absolute level minus 2).

Pass 2: coding of remaining absolute level (remainder) is processed for all scan positions with gt2_flag equal to 1 or gt_flag equal to 1. The non-binary syntax element is binarized with Golomb-Rice code and the resulting bins are coded in the bypass mode of the arithmetic coding engine.

Pass 3: absolute level (absLevel) of the coefficients for which no sig_flag is coded in the first pass (due to reaching the limit of regular-coded bins) are completely coded in the bypass mode of the arithmetic coding engine using a Golomb-Rice code.

Pass 4: coding of the signs (sign_flag) is processed for all scan positions with sig_coeff_flag equal to 1

It is guaranteed that no more than 32 regular-coded bins (sig_flag, par_flag, gt1_flag and gt2_flag) are encoded or decoded for a 4×4 subblock. For 2×2 chroma subblocks, the number of regular-coded bins is limited to 8.

The Rice parameter (ricePar) for coding the non-binary syntax element remainder (in Pass 3) is derived similar to HEVC. At the start of each subblock, ricePar is set equal to 0. After coding a syntax element remainder, the Rice parameter is modified according to predefined equation. For coding the non-binary syntax element absLevel (in Pass 4), the sum of absolute values sumAbs in a local template is determined. The variables ricePar and posZero are determined based on dependent quantization and sumAbs by a table look-up. The intermediate variable codeValue is derived as follows:

If absLevel[k] is equal to 0, codeValue is set equal to posZero;

Otherwise, if absLevel[k] is less than or equal to posZero, codeValue is set equal to absLevel[k]−1;

Otherwise (absLevel[k] is greater than posZero), codeValue is set equal to absLevel [k].

The value of codeValue is coded using a Golomb-Rice code with Rice parameter ricePar.

In the following description of the disclosure, transform coefficient coding is also referred as residual coding.

Decoder-Side Motion Vector Refinement (DMVR) in VVC

Decoder-side Motion Vector Refinement (DMVR) is a technique for blocks coded in bi-prediction Merge mode and controlled by SPS signaling sps_dmvr_enabled_flag flag. Under this mode, the two motion vectors (MV) of the block can be further refined using bilateral matching (BM) prediction.

Figure 3A:
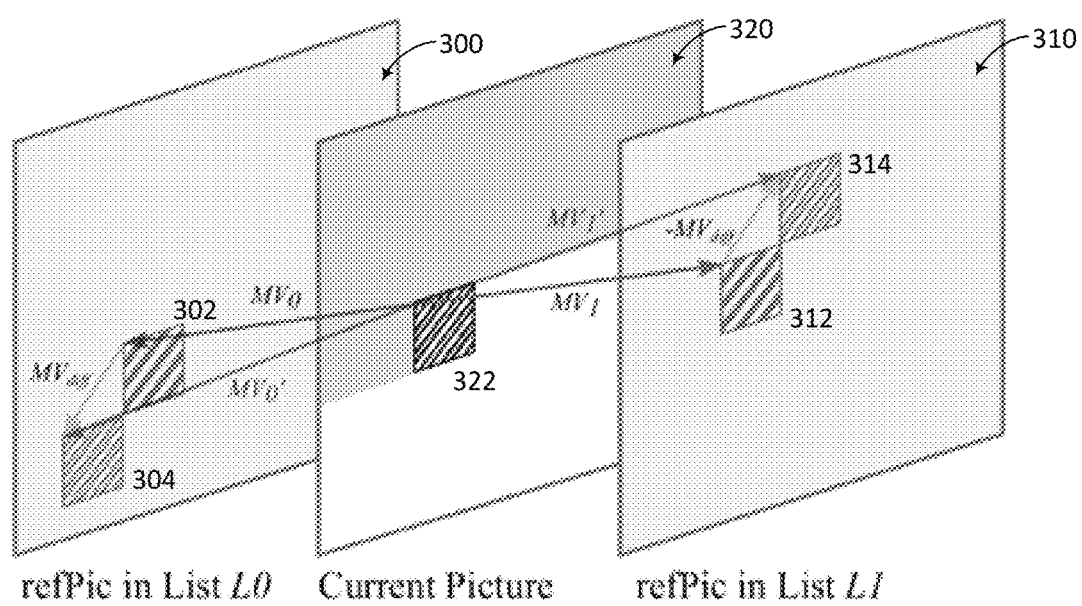
FIG. 3A is a schematic diagram illustrating an example of decoder-side motion vector refinement (DMVR) in accordance with some implementations of the present disclosure.

FIG. 3A is a schematic diagram illustrating an example of decoder-side motion vector refinement (DMVR). As shown in the FIG. 3A, the bilateral matching method is used to refine motion information of a current CU 322 in current picture 320 by searching the closest match between its two reference blocks 302, 312 along the motion trajectory of the current CU in its two associated reference pictures, i.e. refPic in List L0 300 and refPic in List L1 310. The patterned rectangular blocks 322, 302, and 312, indicate the current CU and its two reference blocks based on the initial motion information from Merge mode. The patterned rectangular blocks 304, 314 indicate one pair of reference blocks based on a MV candidate used in the motion refinement search process, i.e. motion vector refinement process.

The MV differences between the MV candidate and the initial MV (also called original MV) are $MV_{diff}$ and $-MV_{diff}$, respectively. The MV candidate and the initial MV are both bi-directional motion vectors. During DMVR, a number of such MV candidates around the initial MV may be checked. Specifically, for each given MV candidate, its two associated reference blocks may be located from its reference pictures in List 0 and List 1 respectively, and the difference between them is calculated. Such block difference is usually measured in SAD (or sum of absolute difference), or row-subsampled SAD (i.e. the SAD calculated with every other row of the block involved). At the end, the MV candidate with the lowest SAD between its two reference blocks becomes the refined MV and used to generate the bi-predicted signal as the actual prediction for the current CU.

In VVC, the DMVR is applied to a CU that satisfies the following conditions:

Coded with CU level merge mode (not subblock merge mode) with bi-prediction MV;

With respect to the current picture, one reference picture of the CU is in the past (i.e. with a POC smaller than the current picture POC) and another reference picture is in the future (i.e. with a POC greater than the current picture POC);

The POC distances (i.e. absolute POC difference) from both reference pictures to the current picture are the same;

CU has more than 64 luma samples in size and the CU height is more than 8 luma samples The refined MV derived by DMVR process is used to generate the inter prediction samples and also used in temporal motion vector prediction for future picture coding. While the original MV is used in deblocking process and also in spatial motion vector prediction for future CU coding. Some additional features of DMVR are illustrated in the following sub-clauses.

Bi-Directional Optical Flow (BDOF) in VVC

The bi-directional optical flow (BDOF) tool is included in VTM5. BDOF, previously referred to as BIO, was included in the JEM. Compared to the JEM version, the BDOF in VTM5 is a simpler version that requires much less computation, especially in terms of number of multiplications and the size of the multiplier. BDOF is controlling by SPS sps_bdof_enabled_flag flag.

BDOF is used to refine the bi-prediction signal of a CU at the 4×4 sub-block level. BDOF is applied to a CU if it satisfies the following conditions: 1) the CU's height is not 4, and the CU is not in size of 4×8, 2) the CU is not coded using affine mode or the ATMVP merge mode; 3) the CU is coded using "true" bi-prediction mode, i.e., one of the two reference pictures is prior to the current picture in display order and the other is after the current picture in display order. BDOF is only applied to the luma component.

As its name indicates, the BDOF mode is based on the optical flow concept, which assumes that the motion of an object is smooth. The BDOF adjusts the prediction sample by calculated the gradient of current block to improve the coding efficiency.

Decoder-Side Controlling for DMVR and BDOF in VVC

In current VVC, BDOF/DMVR are always applied if its SPS flag is enabled and some bi-prediction and size constrains are met for a regular merge candidate.

DMVR is applied to a regular merge mode when all the following conditions are true:

sps_dmvr_enabled_flag is equal to 1 general_merge_flag[xCb][yCb] is equal to 1 both predFlagL0[0][0] and predFlagL1[0][0] are equal to 1 mmvd_merge_flag[xCb][yCb] is equal to 0

DiffPicOrderCnt(currPic, RefPicList[0][refIdxL0]) is equal to DiffPicOrderCnt(RefPicList[1][refIdxL1], currPic)

BcwIdx[xCb][yCb] is equal to 0

Both luma_weight_l0_flag[ refIdxL0] and luma_weight_l1_flag[refIdxL1] are equal to 0 cbWidth is greater than or equal to 8 cbHeight is greater than or equal to 8 cbHeight*cbWidth is greater than or equal to 128

BDOF is applied to bi-prediction when all the following conditions are true:

sps_bdof_enabled_flag is equal to 1.

predFlagL0[xSbIdx][ySbIdx] and predFlagL1[xSbIdx][ySbIdx] are both equal to 1.

DiffPicOrderCnt(currPic, RefPicList[0][refIdxL0])*DiffPicOrderCnt(currPic, RefPicList[1][refIdxL1]) is less than 0.

MotionModelIdc[xCb][yCb] is equal to 0.

merge-subblockflag[xCb][yCb] is equal to 0.

sym_mvd_flag[xCb][yCb] is equal to 0.

BcwIdx[xCb][yCb] is equal to 0.

luma_weight_l0_flag[ refIdxL0] and luma_weight_l1_flag[refIdxL1] are both equal to 0.

cbHeight is greater than or equal to 8 cIdx is equal to 0.

Residual Coding for Transform Skip Mode CU in VVC

VTM5 allows the transform skip mode to be used for luma blocks of size up to 32×32 (inclusive). When a CU is coded in transform skip mode, its prediction residual is quantized and coded using the transform skip residual coding process. This residual coding process is modified from the transform coefficient coding process described in the previous section. In transform skip mode, the residuals of a CU are also coded in units of non-overlapped subblocks of size 4×4. Different from the regular transform coefficient coding process, in transform skip mode, the last coefficient position is not signaled; instead, the coded_subblock_flag is signaled for all 4×4 subblocks in the CU in the forward scan order, i.e., from the top-left subblock to the last subblock.

For each subblock, if the coded_subblock_flag is equal to 1 (i.e., there is at least one non-zero quantized residual in the subblock), coding of the quantized residual levels is performed in three scan passes:

First scan pass: significance flag (sig_coeff_flag), sign flag (coeff_sign_flag), absolute level greater than 1 flag (abs_level_gtx_flag[0]), and parity (par_level_flag) are coded. For a given scan position, if coeff_sig_flag is equal to 1, then coeff_sign_flag is coded, followed by the abs_level_gtx_flag[0] (which specifies whether the absolute level is greater than 1). If abs_level_gtx_flag[0] is equal to 1, then the par_level_flag is additionally coded to specify the parity of the absolute level.

Greater than x scan pass: for each scan position whose absolute level is greater than 1, up to four abs_level_gtx_flag[i] for i=1 . . . 4 are coded to indicate if the absolute level at the given position is greater than 3, 5, 7, or 9, respectively.

Remainder scan pass: The remainder of the absolute level are coded for all scan positions with abs_level_gtx_flag[4] equal to 1 (that is, the absolute level is greater than 9). The remainder of the absolute levels are binarized using reduced rice parameter derivation template.

The bins in scan passes #1 and #2 (the first scan pass and the greater than x scan pass) are context coded until the maximum number of context coded bins in the CU have been exhausted. The maximum number of context coded bins in a residual block is limited to 2*block width*block height, or equivalently, 2 context coded bins per sample position on average. The bins in the last scan pass (the remainder scan pass) are bypass coded.

Lossless Coding in HEVC

The lossless coding mode in HEVC is achieved by simply bypassing transform, quantization, and in-loop filters (deblocking filter, sample adaptive offset, and adaptive loop filter). The design is aimed to enable the lossless coding with minimum changes required to the regular HEVC encoder and decoder implementation for mainstream applications.

In HEVC the lossless coding mode can be turned on or off at the individual CU level. This is done through a syntax cu_transquant_bypass_flag signaled at CU level. In order to reduce signaling overhead where lossless coding mode is unnecessary, the cu_transquant_bypass_flag syntax is not always signaled. It is signaled only when another syntax called transquant_bypass_enabled_flag has a value of 1. In other words, the syntax transquant_bypass_enabled_flag is used to turn on the syntax signaling of cu_transquant_bypass_flag.

In HEVC, the syntax transquant_bypass_enabled_flag is signaled in the picture parameter set (PPS) to indicate whether the syntax cu_transquant_bypass_flag needs to be signaled for every CU inside a picture referring to the PPS. If this flag is set equal to 1, the syntax cu_transquant_bypass_flag is sent at the CU level to signal whether the current CU is coded with the lossless mode or not. If this flag is set equal to 0 in the PPS, cu_transquant_bypass_flag is not sent, and all the CUs in the picture are encoded with transform, quantization, and loop filters involved in the process, which will generally result in a certain level of video quality degradation. To code an entire picture losslessly, one has to set the flag transquant_bypass_enabled_flag in the PPS to 1 and set the CU-level flag cu_transquant_bypass_flag equal to 1 for every CU in the picture. The detailed syntax signaling related to the lossless mode in HEVC is illustrated below.

transquant_bypass_enabled_flag equal to 1 specifies that cu_transquant_bypass_flag is present. transquant_bypass_enabled_flag equal to 0 specifies that cu_transquant_bypass_flag is not present.

cu_transquant_bypass_flag equal to 1 specifies that the scaling and transform process as specified in clause 8.6 and the in-loop filter process as specified in clause 8.7 are bypassed. When cu_transquant_bypass_flag is not present, it is inferred to be equal to 0.

|  | Descriptor |
|---|---|
| pic_parameter_set_rbsp( ) { | |
|   pps_pic_parameter_set_id | ue(v) |
|   pps_seq_parameter_set_id | ue(v) |
|   ... | |
|   transquant_bypass_enabled_flag | u(1) |
|   ... | |
| } | |

|  | Descriptor |
|---|---|
| coding_unit( x0, y0, log2CbSize ) { | |
|   if( transquant_bypass_enabled_flag ) | |
|     cu_transquant_bypass_flag | ae(v) |
|   if( slice_type != I ) | |
|     cu_skip_flag[ x0 ][ y0 ] | ae(v) |
|   ... | |
| } | |

|  | Descriptor |
|---|---|
| transform_unit( x0, y0, xBase, yBase, log2TrafoSize, trafoDepth, blkIdx ) { | |
|   ... | |
|   if( cbfChroma && !cu_transquant_bypass_flag ) | ae(v) |
|     chroma_qp_offset( ) | |
|   ... | |
| } | |

| | Descriptor |
|---|---|
| residual_coding( x0, y0, log2TrafoSize, cIdx ) { <br> if( transform_skip_enabled_flag && !cu_transquant_bypass_flag && ( log2TrafoSize <= Log2MaxTransformSkipSize ) ) <br>   transform_skip_flag[ x0 ][ y0 ][ cIdx ] <br> ... <br> if( cu_transquant_bypass_flag \|\| ( CuPredMode[ x0 ][ y0 ] = = MODE_INTRA && implicit_rdpcm_enabled_flag && transform_skip_flag[ x0 ][ y0 ][ cIdx ] && ( predModeIntra = = 10 \|\| predModeIntra = = 26 ) ) \|\| explicit_rdpcm_flag[ x0 ][ y0 ][ cIdx ] ) <br>   signHidden = 0 <br> ... <br> } | <br><br><br>ae(v) |

In VVC, the maximum CU size is 64×64 and the VPDU is also set as 64×64. The maximum block size for coefficients coding in VVC is 32×32 because of the coefficient zero-out mechanism for width/height greater than 32. Under this constraint, current transform skip only supports up to 32×32 CU so that the maximum block size for residual coding can be aligned with the maximum block size for coefficient coding which is 32×32. However, in VVC, the constraint for the block size of residual coding for a lossless CU is not defined. As a result, currently in VVC it is possible to generate a residual block under lossless coding mode with a size greater than 32×32, which would require the support of residual coding for blocks greater than 32×32. This is not preferred for the codec implementation. In this disclosure, several methods are proposed to address this issue.

Another issue associated with lossless coding support in VVC is how to choose the residual (or referred as coefficient) coding scheme. In the current VVC two different residual coding schemes are available. For a given block (or CU), the selection of residual coding scheme is based on the transform skip flag of a given block (or CU). Therefore, if under lossless mode the transform skip flag is assumed to be 1 in VVC as in HEVC, the residual coding scheme used under transform skip mode would be always used for a lossless mode CU. However, the current residual coding scheme used when the transform skip flag is true is designed mainly for screen content coding. It may not be optimal to be used for lossless coding of regular content (i.e. non-screen content). In this disclosure, several methods are proposed to select the residual coding for lossless CUs.

In current VVC, two decoder-side tools, i.e., BDOF and DMVR, refined decoded pixel by filtering current block therefore improving the coding performance. However, in lossless coding, since the prediction pixels are already perfectly predicted, the BDOF and DMVR do not contribute coding gain. Hence, the BDOF and DMVR should not be applied in lossless coding because theses decoder-side tools are not benefit for VVC. However, in current VVC, BDOF and DMVR are always applied if its SPS flag is enabled and some bi-prediction and size constrains are met for a regular merge candidate. Therefore, for lossless VVC coding, it is benefit for the performance efficiency of VVC lossless coding if controlling DMVR and BDOF in lower level, i.e., slice level and cu level.

Residual Block Partition for Lossless CU

According to an example of the disclosure, it is proposed to align the maximum residual coding block size for a lossless CU with the maximum block size supported by transform skip mode. In one example, the transform skip mode can only be enabled for a residual block whose width and height are both smaller than or equal to 32, which means the maximum residual coding block size under transform skip mode is 32×32. According to the example, the maximum width and/or height of the residual block for a lossless CU is also set to be 32, with a maximum residual block size as 32×32. Whenever the width/height of a lossless CU is greater than 32, the CU residual block is divided into multiple smaller residual blocks with a size of 32×N and/or N×32 so that the width or height of the smaller residual blocks are not greater than 32. For example, a 128×32 lossless CU is divided into four 32×32 residual blocks for residual coding. In another example, a 64×64 lossless CU is divided into four 32×32 residual blocks.

According to another example of the disclosure, it is proposed to align the maximum block size for residual coding for a lossless CU with the size of VPDU. In one example, the width/height of maximum residual block for lossless CU is set to the VPDU size (e.g. 64×64 in current VVC). Whenever the width/height of a lossless CU is greater than 64, the CU residual block is divided into multiple smaller residual blocks with a size of 64×N and/or N×64 so that the width or height of the smaller residual blocks are not greater than VPDU width and/or height. For example, a 128×128 lossless CU is divided into four 64×64 residual blocks for residual coding. In another example, a 128×32 lossless CU is divided into two 64×32 residual blocks.

Selection of Residual Coding Scheme for a Lossless Mode CU

In current VVC, different residual coding schemes are utilized by a CU depending on if the CU is coded with the transform skip mode. The current residual coding used under transform skip mode is generally more suitable for screen content coding.

According to an example of the present disclosure, a lossless CU uses the same residual coding scheme as the one used by the transform skip mode CUs.

According to another example of the present disclosure, a lossless CU uses the same residual coding scheme as the one used by the non-transform skip mode CUs.

According to another example of the present disclosure, the residual coding scheme for lossless CUs is selected adaptively from the existing residual coding schemes based on certain conditions and/or predefined procedures. Such conditions and/or predefined procedures are followed by both the encoder and decoder, so that there is no signaling needed in the bitstream to indicate the selection. In one example, a simple screen content detection scheme may be specified and utilized in both encoder and decoder. Based on the detection scheme, a current video block may be classified as screen content or regular content. In case it is screen content, the residual coding scheme used under transform skip mode is selected. Otherwise, the other residual coding scheme is selected.

According to another example of the present disclosure, syntax is signaled in the bitstream to explicitly specify which residual coding scheme is used by a lossless CU. Such a syntax may be a binary flag, with each binary value indicating the selection of one of the two residual coding schemes. The syntax can be signaled at different levels. For example, it may be signaled in sequence parameter set (SPS), picture parameter set (PPS), slice header, tiles group header, or tile. It may also be signaled at CTU or CU level. When such a syntax is signaled, all the lossless CUs at the same or lower level would use the same residual coding scheme indicated by the syntax. For example, when the syntax is signaled at SPS level, all the lossless CUs in the sequence would use the same residual coding scheme indicated. When the syntax is signaled at PPS level, all the lossless CUs in a picture would use the same residual coding scheme indicated in the associated PPS. In case there is a syntax at CU level to indicate if a CU is coded in lossless mode, such as the cu_transquant_bypass_flag, the syntax indicating residual coding scheme is conditionally signaled based on the lossless mode flag of the CU. For example, only when the lossless mode flag cu_transquant_bypass_flag indicates that the current CU is coded in lossless mode, the syntax indicating residual coding scheme is signaled for the CU. When the syntax is signaled by a flag at slice header level, all the CUs coded in lossless mode within this slice would use the same residual coding scheme identified based on the signaled flag. The residual coding scheme for each one of the plurality of CUs is selected based on the signaled first flag, where the residual coding scheme selected for the lossless CU is the residual coding scheme used by transform skip mode CUs or the non-transform skip mode CUs depending on the signaled flag at the slice header.

According to an example of the present disclosure, even for a lossless mode coded CU, a transform skip mode flag is signaled. In this case, regardless s of a CU being coded in lossless mode or not, the selection of residual coding scheme for the CU is based on its transform skip mode flag.

Disabling DMVR

In current VVC, the controlling of DMVR on/off is not defined for lossless coding mode. In an example of the disclosure, it is proposed to control turn on/off DMVR in slice level by a 1-bit signaling slice_disable_dmvr_flag flag. In one example, the slice_disable_dmvr_flag flag is needed to be signaled if sps_dmvr_enabled_flag is set equal to 1 and transquant_bypass_enabled_flag flag is set equal to 0. If slice_disable_dmvr_flag flag is not signaled, it is inferred to be 1. If slice_disable_dmvr_flag is equal to 1, DMVR is turned off. In this case, the signaling is as followed:

```
if( sps_dmvr_enabled_flag && !transquant_bypass_enabled_flag)
    slice_disable_dmvr_flag                                     u(1)
```

In another example, it is proposed to control turn on/off DMVR in cu level by cu_transquant_bypass_flag. In one example, the cu level controlling for DMVR is followed:
DMVR is Applied to a Regular Merge Mode when all the Following Conditions are True:
    sps_dmvr_enabled_flag is equal to 1
    cu_transquant_bypass_flag is set equal to 0
    general_merge_flag[xCb][yCb] is equal to 1 both predFlagL0[0][0] and predFlagL1[0][0] are equal to 1
    mmvd_merge_flag[xCb][yCb] is equal to 0
    DiffPicOrderCnt(currPic, RefPicList[0][refIdxL0]) is equal to DiffPicOrderCnt(RefPicList[1][refIdxL1], currPic)
    BcwIdx[xCb][yCb] is equal to 0
    Both luma_weight_l0_flag[refIdxL0] and luma_weight_l1_flag[refIdxL1] are equal to 0
    cbWidth is greater than or equal to 8
    cbHeight is greater than or equal to 8
    cbHeight*cbWidth is greater than or equal to 128

Disabling BDOF

In current VVC, the controlling of BDOF on/off is not defined for lossless coding mode. In an example of the present disclosure, it is proposed to control turn on/off BDOF by a 1-bit signaling slice_disable_bdof_flag flag. In one example, the slice_disable_bdof_flag flag is signaled if sps_bdof_enabled_flag is set equal to 1 or transquant_bypass_enabled_flag flag is set equal to 0. If slice_disable_bdof_flag flag is not signaled, it is inferred to be 1. If slice_disable_bdof_flag flag is equal to 1, BDOF is disable. In this case, the signaling is illustrated as follows:

```
if( sps_bdof_enabled_flag && !transquant_bypass_enabled_flag)
    slice_disable_bdof_flag                                     u(1)
```

In another example of the present disclosure, it is proposed to control turn on/off BDOF in cu level by cu_transquant_bypass_flag. In one example, the cu level controlling for BDOF is followed:
BDOF is Applied to a Regular Merge Mode when all the Following Conditions are True:
    sps_bdof_enabled_flag is equal to 1.
    cu_transquant_bypass_flag is set equal to 0
    predFlagL0[xSbIdx][ySbIdx] and predFlagL1[ xSbIdx][ySbIdx] are both equal to 1.
    DiffPicOrderCnt(currPic, RefPicList[0][refIdxL0])*DiffPicOrderCnt(currPic, RefPicList[1][refIdxL1]) is less than 0.
    MotionModelIdc[xCb][yCb] is equal to 0.
    merge_subblock_flag[xCb][yCb] is equal to 0.
    sym_mvd_flag[xCb][yCb] is equal to 0.
    BcwIdx[xCb][yCb] is equal to 0.
    luma_weight_l0_flag[refIdxL0] and luma_weight_l1_flag[refIdxL1] are both equal to 0.
    cbHeight is greater than or equal to 8
    cIdx is equal to 0.

Disabling BDOF and DMVR

In current VVC, both of BDOF and DMVR are always applied for decoder-side refinement to improve coding efficiency and controlled by each SPS flag and condition of some bi-prediction and size constrains are met for a regular merge candidate. In an example of the present disclosure, it is proposed to disable both BDOF and DMVR by a 1-bit slice_disable_bdof_dmvr_flag slice flag. If the slice_disable_bdof_dmvr_flag flag is set equal to 1, both BDOF and DMVR are turned off If slice_disable_bdof_dmvr_flag flag is not signaled, it is inferred to be 1. In one example, slice_disable_bdof_dmvr_flag is signaled if following condition is met.

```
if( (sps_bdof_enabled_flag || sps_dmvr_enabled_flag) &&
    !transquant_bypass_enabled_flag )
    slice_disable_bdof_dmvr_flag                          u(1)
```

The above methods may be implemented using an apparatus that includes one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The apparatus may use the circuitries in combination with the other hardware or software components for performing the above described methods. Each module, sub-module, unit, or sub-unit disclosed above may be implemented at least partially using the one or more circuitries.

Figure 7:
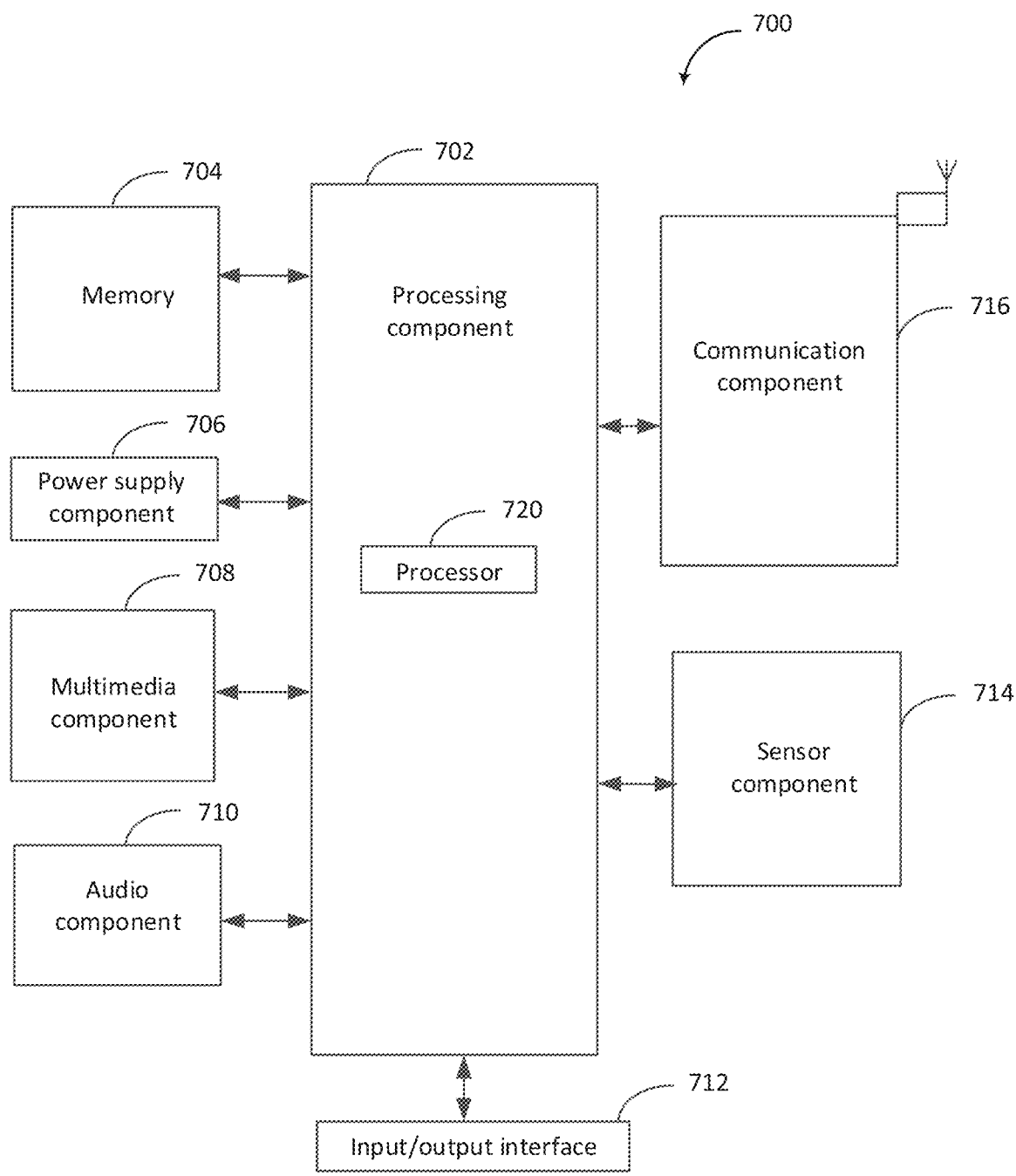
FIG. 7 is a block diagram illustrating an exemplary apparatus of lossless coding modes for video coding in accordance with some implementations of the present disclosure.

FIG. 7 is a block diagram illustrating an apparatus for video coding in accordance with some implementations of the present disclosure. The apparatus 700 may be a terminal, such as a mobile phone, a tablet computer, a digital broadcast terminal, a tablet device, or a personal digital assistant.

As shown in FIG. 7, the apparatus 700 may include one or more of the following components: a processing component 702, a memory 704, a power supply component 706, a multimedia component 708, an audio component 710, an input/output (I/O) interface 712, a sensor component 714, and a communication component 716.

The processing component 702 usually controls overall operations of the apparatus 700, such as operations relating to display, a telephone call, data communication, a camera operation and a recording operation. The processing component 702 may include one or more processors 720 for executing instructions to complete all or a part of steps of the above method. Further, the processing component 702 may include one or more modules to facilitate interaction between the processing component 702 and other components. For example, the processing component 702 may include a multimedia module to facilitate the interaction between the multimedia component 708 and the processing component 702.

The memory 704 is configured to store different types of data to support operations of the apparatus 700. Examples of such data include instructions, contact data, phonebook data, messages, pictures, videos, and so on for any application or method that operates on the apparatus 700. The memory 704 may be implemented by any type of volatile or non-volatile storage devices or a combination thereof, and the memory 704 may be a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or a compact disk.

The power supply component 706 supplies power for different components of the apparatus 700. The power supply component 706 may include a power supply management system, one or more power supplies, and other components associated with generating, managing and distributing power for the apparatus 700.

The multimedia component 708 includes a screen providing an output interface between the apparatus 700 and a user. In some examples, the screen may include a Liquid Crystal Display (LCD) and a Touch Panel (TP). If the screen includes a touch panel, the screen may be implemented as a touch screen receiving an input signal from a user. The touch panel may include one or more touch sensors for sensing a touch, a slide and a gesture on the touch panel. The touch sensor may not only sense a boundary of a touching or sliding actions, but also detect duration and pressure related to the touching or sliding operation. In some examples, the multimedia component 708 may include a front camera and/or a rear camera. When the apparatus 700 is in an operation mode, such as a shooting mode or a video mode, the front camera and/or the rear camera may receive external multimedia data.

The audio component 710 is configured to output and/or input an audio signal. For example, the audio component 710 includes a microphone (MIC). When the apparatus 700 is in an operating mode, such as a call mode, a recording mode and a voice recognition mode, the microphone is configured to receive an external audio signal. The received audio signal may be further stored in the memory 704 or sent via the communication component 716. In some examples, the audio component 710 further includes a speaker for outputting an audio signal.

The I/O interface 712 provides an interface between the processing component 702 and a peripheral interface module. The above peripheral interface module may be a keyboard, a click wheel, a button, or the like. These buttons may include but not limited to, a home button, a volume button, a start button and a lock button.

The sensor component 714 includes one or more sensors for providing a state assessment in different aspects for the apparatus 700. For example, the sensor component 714 may detect an on/off state of the apparatus 700 and relative locations of components. For example, the components are a display and a keypad of the apparatus 700. The sensor component 714 may also detect a position change of the apparatus 700 or a component of the apparatus 700, presence or absence of a contact of a user on the apparatus 700, an orientation or acceleration/deceleration of the apparatus 700, and a temperature change of apparatus 700. The sensor component 714 may include a proximity sensor configured to detect presence of a nearby object without any physical touch. The sensor component 714 may further include an optical sensor, such as a CMOS or CCD image sensor used in an imaging application. In some examples, the sensor component 714 may further include an acceleration sensor, a gyroscope sensor, a magnetic sensor, a pressure sensor, or a temperature sensor.

The communication component 716 is configured to facilitate wired or wireless communication between the apparatus 700 and other devices. The apparatus 700 may access a wireless network based on a communication standard, such as WiFi, 4G, or a combination thereof. In an example, the communication component 716 receives a broadcast signal or broadcast related information from an external broadcast management system via a broadcast channel. In an example, the communication component 716 may further include a Near Field Communication (NFC) module for promoting short-range communication. For example, the NFC module may be implemented based on Radio Frequency Identification (RFID) technology, infrared data association (IrDA) technology, Ultra-Wide Band (UWB) technology, Bluetooth (BT) technology and other technology.

In an example, the apparatus 700 may be implemented by one or more of Application Specific Integrated Circuits (ASIC), Digital Signal Processors (DSP), Digital Signal Processing Devices (DSPD), Programmable Logic Devices (PLD), Field Programmable Gate Arrays (FPGA), controllers, microcontrollers, microprocessors or other electronic elements to perform the above method.

A non-transitory computer readable storage medium may be, for example, a Hard Disk Drive (HDD), a Solid-State Drive (SSD), Flash memory, a Hybrid Drive or Solid-State Hybrid Drive (SSHD), a Read-Only Memory (ROM), a Compact Disc Read-Only Memory (CD-ROM), a magnetic tape, a floppy disk and etc.

Figure 8:
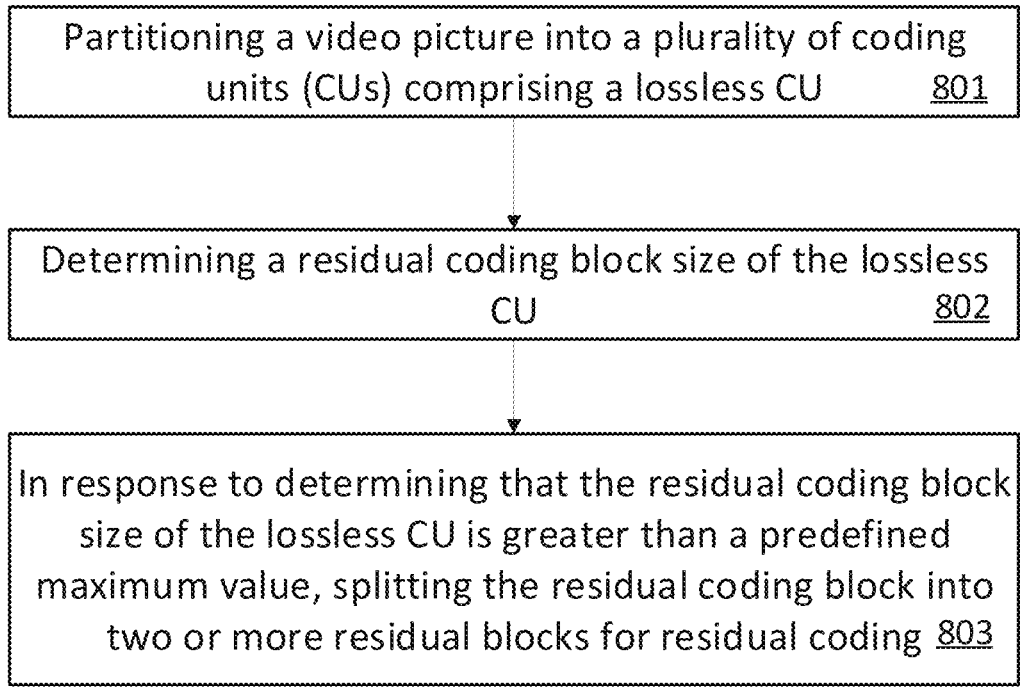
FIG. 8 is a flowchart illustrating an exemplary process of lossless coding modes for video coding in accordance with some implementations of the present disclosure.

FIG. 8 is a flowchart illustrating an exemplary process of techniques relating to lossless coding modes in video coding in accordance with some implementations of the present disclosure.

In step 801, the processor 720 partitions a video picture into a plurality of coding units (CUs), at least one of which is a lossless CU.

In step 802, the processor 720 determines a residual coding block size of the lossless CU.

In step 803, the processor 720 splits the residual coding block into two or more residual blocks for residual coding, in response to determining that the residual coding block size of the lossless CU is greater than a predefined maximum value.

In some examples, there is provided an apparatus for video coding. The apparatus includes a processor 720; and a memory 704 configured to store instructions executable by the processor; where the processor, upon execution of the instructions, is configured to perform a method as illustrated in FIG. 8.

In some other examples, there is provided a non-transitory computer readable storage medium 704, having instructions stored therein. When the instructions are executed by a processor 720, the instructions cause the processor to perform a method as illustrated in FIG. 8.

Figure 9:
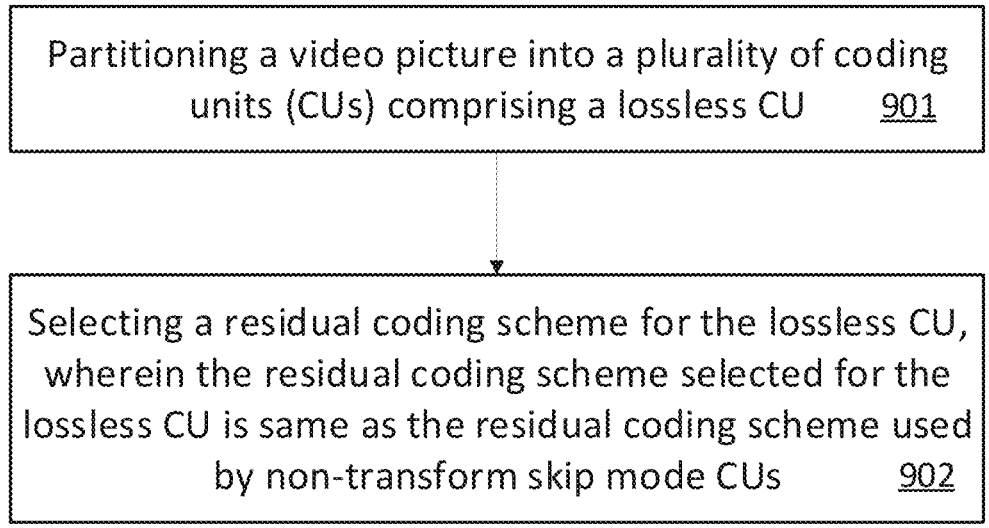
FIG. 9 is a flowchart illustrating another exemplary process of lossless coding modes for video coding in accordance with some implementations of the present disclosure.

FIG. 9 is a flowchart illustrating an exemplary process of techniques relating to lossless coding modes in video coding in accordance with some implementations of the present disclosure.

In step 901, the processor 720 partitions a video picture into a plurality of coding units (CUs), at least one of which is a lossless CU.

In step 902, the processor 720 selects a residual coding scheme for the lossless CU, wherein the residual coding scheme selected for the lossless CU is same as the residual coding scheme used by non-transform skip mode CUs.

In some examples, there is provided an apparatus for video coding. The apparatus includes a processor 720; and a memory 704 configured to store instructions executable by the processor; where the processor, upon execution of the instructions, is configured to perform a method as illustrated in FIG. 9.

In some other examples, there is provided a non-transitory computer readable storage medium 704, having instructions stored therein. When the instructions are executed by a processor 720, the instructions cause the processor to perform a method as illustrated in FIG. 9.

According to the present disclosure, a method for video decoding comprises: determining a residual coding scheme for a block of a video picture in a transform skip mode based on a first indication and a second indication derived from a bitstream, wherein the first indication represents the transform-skip mode, and the second indication indicates whether a first residual coding scheme or a second residual coding scheme is selected for the block in the transform-skip mode.

According to an embodiment of the present disclosure, the first residual coding scheme is configured for blocks in a transform-skip mode.

According to an embodiment of the present disclosure, the second residual coding scheme is configured for blocks in a non-transform-skip mode.

According to an embodiment of the present disclosure, the second indication is derived from the bitstream based on a predefined condition.

According to an embodiment of the present disclosure, the second indication is a signaled syntax in the bitstream.

According to an embodiment of the present disclosure, the second indication is a flag at a slice header, and the method further comprises: determining a residual coding scheme for each block of a slice in the transform-skip mode based on the flag.

According to an embodiment of the present disclosure, the method for video decoding further comprises: signaling a 1-bit flag for the block to control turning on and off decoder-side motion vector refinement (DMVR) at slice level or picture level.

According to an embodiment of the present disclosure, the method for video decoding further comprises: signaling a 1-bit flag for the block to control turning on and off decoder-side motion vector refinement (DMVR) at CU level.

According to an embodiment of the present disclosure, the method for video decoding further comprises: signaling a 1-bit flag for the block to control turning on and off bi-directional optical flow (BDOF) at slice level or picture level.

According to an embodiment of the present disclosure, the method for video decoding further comprises: signaling a 1-bit flag for the block to control turning on and off bi-directional optical flow (BDOF) at CU level.

According to an embodiment of the present disclosure, the method for video decoding further comprises: signaling a 1-bit flag for the block to control turning on and off both decoder-side motion vector refinement (DMVR) and bi-directional optical flow (BDOF) at slice level or picture level.

According to the present disclosure, an apparatus for video decoding comprises: one or more processors; and a memory configured to store instructions executable by the one or more processors; wherein the one or more processors, upon execution of the instructions, are configured to: determining a residual coding scheme for a block of a video picture in a transform skip mode based on a first indication and a second indication derived from a bitstream, wherein the first indication represents the transform-skip mode, and the second indication indicates whether a first residual coding scheme or a second residual coding scheme is selected for the block in the transform-skip mode.

According to an embodiment of the present disclosure, the first residual coding scheme is configured for blocks in a transform-skip mode.

According to an embodiment of the present disclosure, the second residual coding scheme is configured for blocks in a non-transform-skip mode.

According to an embodiment of the present disclosure, the second indication is derived from the bitstream based on a predefined condition.

According to an embodiment of the present disclosure, the second indication is a signaled syntax in the bitstream.

According to an embodiment of the present disclosure, the second indication is a flag at a slice header, and the one or more processors, upon execution of the instructions, are further configured to: determining a residual coding scheme for each block of a slice in the transform-skip mode based on the flag.

According to an embodiment of the present disclosure, the one or more processors, upon execution of the instructions, are further configured to: signal a 1-bit flag for the block to control turning on and off decoder-side motion vector refinement (DMVR) at slice level or picture level.

According to an embodiment of the present disclosure, the one or more processors, upon execution of the instructions, are further configured to: signal a 1-bit flag for the block to control turning on and off decoder-side motion vector refinement (DMVR) at CU level.

According to an embodiment of the present disclosure, the one or more processors, upon execution of the instructions, are further configured to: signal a 1-bit flag for the block to control turning on and off bi-directional optical flow (BDOF) at slice level or picture level.

According to an embodiment of the present disclosure, the one or more processors, upon execution of the instructions, are further configured to: signal a 1-bit flag for the block to control turning on and off bi-directional optical flow (BDOF) at CU level.

According to an embodiment of the present disclosure, the one or more processors are further configured to: signal a 1-bit flag for the block to control turning on and off both decoder-side motion vector refinement (DMVR) and bi-directional optical flow (BDOF) at slice level or picture level.

According to the present disclosure, a non-transitory computer readable storage medium stores a plurality of programs for execution by a computing device having one or more processors, wherein the plurality of programs, when executed by the one or more processors, cause the computing device to perform acts comprising: determining a residual coding scheme for a block of a video picture in a transform skip mode based on a first indication and a second indication derived from a bitstream, wherein the first indication represents the transform-skip mode, and the second indication indicates whether a first residual coding scheme or a second residual coding scheme is selected for the block in the transform-skip mode.

According to an embodiment of the present disclosure, the first residual coding scheme is configured for blocks in a transform-skip mode.

According to an embodiment of the present disclosure, the second residual coding scheme is configured for blocks in a non-transform-skip mode.

According to an embodiment of the present disclosure, the second indication is derived from the bitstream based on a predefined condition.

According to an embodiment of the present disclosure, the second indication is a signaled syntax in the bitstream.

According to an embodiment of the present disclosure, the second indication is a flag at a slice header, and the plurality of programs, when executed by the one or more processors, cause the computing device to further perform acts comprising: determining a residual coding scheme for each block of a slice in the transform-skip mode based on the flag.

According to an embodiment of the present disclosure, the plurality of programs, when executed by the one or more processors, cause the computing device to further perform acts comprising: signal a 1-bit flag for the block to control turning on and off decoder-side motion vector refinement (DMVR) at slice level or picture level.

According to an embodiment of the present disclosure, the plurality of programs, when executed by the one or more processors, cause the computing device to further perform acts comprising: signal a 1-bit flag for the block to control turning on and off decoder-side motion vector refinement (DMVR) at CU level.

According to an embodiment of the present disclosure, the plurality of programs, when executed by the one or more processors, cause the computing device to further perform acts comprising: signal a 1-bit flag for the block to control turning on and off bi-directional optical flow (BDOF) at slice level or picture level.

According to an embodiment of the present disclosure, the plurality of programs, when executed by the one or more processors, cause the computing device to further perform acts comprising: signal a 1-bit flag for the block to control turning on and off bi-directional optical flow (BDOF) at CU level.

The description of the present disclosure has been presented for purposes of illustration, and is not intended to be exhaustive or limited to the present disclosure. Many modifications, variations, and alternative implementations will be apparent to those of ordinary skill in the art having the benefit of the teachings presented in the foregoing descriptions and the associated drawings.

The examples were chosen and described in order to explain the principles of the disclosure, and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A method for video decoding, comprising:
   determining whether a current block is in a transform skip mode based on a first indication derived from a bitstream; and
   in response to determining that the current block is in the transform skip mode, determining whether a first residual coding scheme or a second residual coding scheme is selected for the current block in the transform skip mode based on a second indication derived from the bitstream,
   wherein the second indication is obtained at slice header level, and is used to indicate which one of the first residual coding scheme and the second residual coding scheme is used for blocks in the transform skip mode within a current slice, and the second indication equaling to 1 indicates that the first residual coding scheme is used for blocks in the transform skip mode, and the second indication equaling to 0 indicates that the second residual coding scheme is used for blocks in the transform skip mode.

2. The method for video decoding of claim 1, further comprising:
   receiving a 1-bit flag for the current block to control turning on and off decoder-side motion vector refinement (DMVR) at slice level or picture level.

3. The method for video decoding of claim 1, further comprising:
   receiving a 1-bit flag for the current block to control turning on and off decoder-side motion vector refinement (DMVR) at CU level.

4. The method for video coding of claim 1, further comprising:
   receiving a 1-bit flag for the current block to control turning on and off bi-directional optical flow (BDOF) at slice level or picture level.

5. The method for video coding of claim 1, further comprising:
   receiving a 1-bit flag for the current block to control turning on and off bi-directional optical flow (BDOF) at CU level.

6. The method for video coding of claim 1, further comprising:
   receiving a 1-bit flag for the current block to control turning on and off both decoder-side motion vector refinement (DMVR) and bi-directional optical flow (BDOF) at slice level or picture level.

7. An apparatus for video decoding, comprising:
   one or more processors; and
   a memory configured to store instructions executable by the one or more processors; wherein the one or more processors, upon execution of the instructions, are configured to:
   determine whether a current block is in a transform skip mode based on a first indication derived from a bitstream; and
   in response to determining that the current block is in the transform skip mode, determine whether a first residual coding scheme or a second residual coding scheme is selected for the current block in the transform skip mode based on a second indication derived from the bitstream,
   wherein the second indication is obtained at slice header level, and is used to indicate which one of the first residual coding scheme and the second residual coding scheme is used for blocks in the transform skip mode within a current slice, and the second indication equaling to 1 indicates that the first residual coding scheme is used for blocks in the transform skip mode, and the second indication equaling to 0 indicates that the second residual coding scheme is used for blocks in the transform skip mode.

8. The apparatus for video decoding of claim 7, wherein the one or more processors, upon execution of the instructions, are further configured to:
   receive a 1-bit flag for the current block to control turning on and off decoder-side motion vector refinement (DMVR) at slice level or picture level.

9. The apparatus for video decoding of claim 7, wherein the one or more processors, upon execution of the instructions, are further configured to:
   receive a 1-bit flag for the current block to control turning on and off decoder-side motion vector refinement (DMVR) at CU level.

10. The apparatus for video decoding of claim 7, wherein the one or more processors, upon execution of the instructions, are further configured to:
    receive a 1-bit flag for the current block to control turning on and off bi-directional optical flow (BDOF) at slice level or picture level.

11. The apparatus for video decoding of claim 7, wherein the one or more processors, upon execution of the instructions, are further configured to:
    receive a 1-bit flag for the current block to control turning on and off bi-directional optical flow (BDOF) at CU level.

12. The apparatus for video decoding of claim 7, wherein the one or more processors are further configured to:
    receive a 1-bit flag for the current block to control turning on and off both decoder-side motion vector refinement (DMVR) and bi-directional optical flow (BDOF) at slice level or picture level.

13. A non-transitory computer readable storage medium storing a bitstream to be decoded by acts comprising:
    determining whether a current block is in a transform skip mode based on a first indication derived from a bitstream; and
    in response to determining that the current block is in the transform skip mode, determining whether a first residual coding scheme or a second residual coding scheme is selected for the current block in the transform skip mode based on a second indication derived from the bitstream;
    wherein the second indication is obtained at slice header level, and is used to indicate which one of the first residual coding scheme and the second residual coding scheme is used for blocks in the transform skip mode within a current slice, and the second indication equaling to 1 indicates that the first residual coding scheme is used for blocks in the transform skip mode, and the second indication equaling to 0 indicates that the second residual coding scheme is used for blocks in the transform skip mode.

14. The non-transitory computer readable storage medium of claim 13, wherein the bitstream is decoded by acts further comprising:
    receiving a 1-bit flag for the current block to control turning on and off decoder-side motion vector refinement (DMVR) at slice level or picture level.

15. The non-transitory computer readable storage medium of claim 13, wherein the bitstream is decoded by acts further comprising:
    receiving a 1-bit flag for the current block to control turning on and off decoder-side motion vector refinement (DMVR) at CU level.

16. The non-transitory computer readable storage medium of claim 13, wherein the bitstream is decoded by acts further comprising:
    receiving a 1-bit flag for the current block to control turning on and off bi-directional optical flow (BDOF) at slice level or picture level.

17. The non-transitory computer readable storage medium of claim 13, wherein the bitstream is decoded by acts further comprising:
    receiving a 1-bit flag for the current block to control turning on and off bi-directional optical flow (BDOF) at CU level.

* * * * *